United States Patent
Schuller

(10) Patent No.: US 9,411,429 B2
(45) Date of Patent: Aug. 9, 2016

(54) ROTARY CONTROLLER ARRANGEMENT

(71) Applicant: Google Inc., Mountain View, CA (US)

(72) Inventor: Donald Geoffrey Schuller, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/310,883

(22) Filed: Jun. 20, 2014

(65) Prior Publication Data

US 2015/0370344 A1    Dec. 24, 2015

(51) Int. Cl.
*G06F 3/023* (2006.01)
*G06F 3/0362* (2013.01)

(52) U.S. Cl.
CPC ............ *G06F 3/0236* (2013.01); *G06F 3/0234* (2013.01); *G06F 3/0362* (2013.01)

(58) Field of Classification Search
CPC .... G06F 3/0236; G06F 3/0234; G06F 3/0362
See application file for complete search history.

(56) References Cited

U.S. PATENT DOCUMENTS

| | | | |
|---|---|---|---|
| 2004/0021702 A1* | 2/2004 | Lucaci | G06F 1/1626 715/864 |
| 2007/0155434 A1* | 7/2007 | Jobs et al. | 455/565 |
| 2009/0289923 A1* | 11/2009 | Inoue et al. | 345/184 |
| 2010/0271340 A1* | 10/2010 | Nagashima et al. | 345/184 |
| 2015/0253750 A1* | 9/2015 | Eronen | G05B 15/02 700/12 |

* cited by examiner

*Primary Examiner* — Christopher E Leiby
(74) *Attorney, Agent, or Firm* — Morris & Kamlay LLP

(57) ABSTRACT

The present disclosure provides methods and systems for a rotary controller arrangement. A method may include receiving an indication that a rotary control element is moved to a first end position. A first action may be performed based on a selection of the first action at the first end position. An indication that the rotary control element is moved to a second end position may be received. A second action may be performed based on a selection of the second action at the second end position. The disclosed rotary controller arrangement includes assigning an action to the end point of rotation of a rotary control element. By assigning an action to an end point of rotation, a user may rotate the rotary control element to a particular end point to easily find and select the desired action.

14 Claims, 4 Drawing Sheets

ROTARY CONTROLLER ARRANGEMENT

BACKGROUND

Many automotive multimedia systems include a rotating control knob for controlling various functions and features of the multimedia system. However, finding and selecting a particular action using a rotating control knob while driving can lead to driver distraction. For example, if a user is using the rotating control knob to input a phone number in a telephone function, the user may make a mistake in selecting a digit and the user may need to delete the digit. In this case, finding and selecting a delete action using a rotating control knob can be difficult and may lead to driver distraction.

BRIEF SUMMARY

According to an embodiment of the disclosed subject matter a method may include receiving an indication that a rotary control element is moved to a first end position. A first action may be performed based on a selection of the first action at the first end position. An indication that the rotary control element is moved to a second end position may be received. A second action may be performed based on a selection of the second action at the second end position.

An implementation of the disclosed subject matter provides a system including a processor configured to receive an indication that a rotary control element is moved to a first end position and perform a first action based on a selection of the first action at the first end position. Next, an indication may be received that the rotary control element is moved to a second end position, and a second action may be performed based on a selection of the second action at the second end position.

In an implementation, a system according to the disclosed subject matter includes means for receiving an indication that a rotary control element is moved to a first end position and means for performing a first action based on a selection of the first action at the first end position. The system also includes means for receiving an indication that the rotary control element is moved to a second end position and means for performing a second action based on a selection of the second action at the second end position.

Implementations of the disclosed subject matter provide methods and systems for a rotary controller arrangement. The disclosed rotary controller arrangement includes assigning actions to the end points of rotation of a rotary control element. By assigning an action to an end point of rotation, a user may rotate the rotary control element "all the way left" or "all the way right" to find and select the desired action, thus reducing the amount of attention the user must place in order to perform the desired action. This feature may reduce driver distraction and is, therefore, valuable in an automotive user experience. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
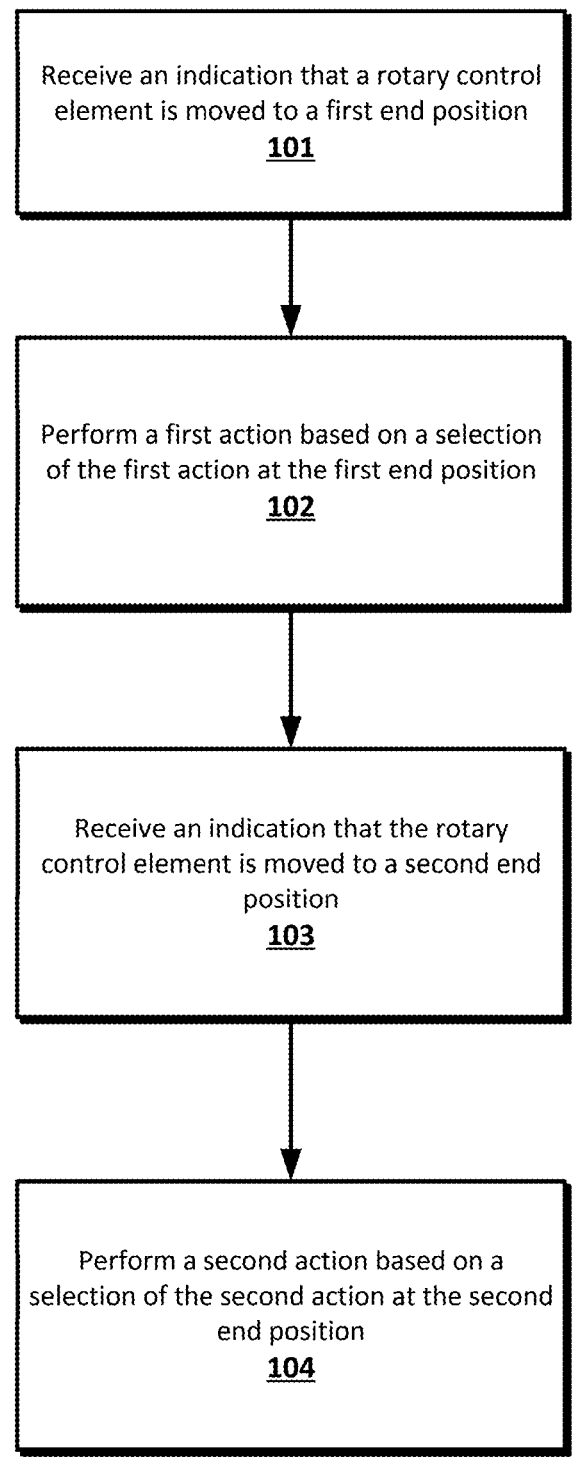
FIG. 1 shows an example process according to an embodiment of the disclosed subject matter.

Many automotive multimedia systems include a rotating control element for controlling various functions and features of the multimedia system. In some cases, a rotating control element can be used in conjunction with a visual display or user interface. However, when using a rotating control element a user may wish to take a particular action quickly without requiring much distraction from driving. In this case, it can be difficult for a user to rotate the control element and find the desired action quickly and easily. For example, if a user is using the rotating control element to input a phone number in a telephone function, the user may make a mistake in selecting a digit and the user may need to delete the digit. In this case, finding and selecting a delete action using a rotating control element can be difficult and may lead to driver distraction. For example, the user may have to rotate the rotating control element while paying attention to a visual display or user interface in order for the user to select the delete action.

The present disclosure provides methods and systems for a rotary controller arrangement. The disclosed rotary controller arrangement rotary includes discrete endpoints and allows the assignment of particular actions to each of the end points of rotation of a rotary control element. By assigning an action to each of the end points of rotation, a user may rotate the rotary control element to one end point or to the opposite end point to find and select the desired action that is assigned to the specific end point. This disclosed feature may reduce the amount of attention required by the user in order to select the desired action and may allow the user to perform the desired action more quickly and easily.

As an example, while driving, a user may wish to place a call using the telephone feature of his automotive multimedia system. The multimedia system may include a rotary control element and a user interface. The user may rotate the rotary control element to select the digits of the phone number he wishes to dial. While selecting the digits of the phone number, he may accidentally select an incorrect digit. In this case, the user may, for example, quickly rotate the rotary control element counterclockwise to the left end point. The left end point may be associated with a delete action when the multimedia system is in the telephone mode. Once the user has fully rotated the rotary control element counterclockwise to the left end point, the user may select the delete action, e.g., by pressing the rotary control element or actuating a similar selection interface element. As a result, the incorrect digit may be deleted. The user may then complete inputting the digits of the phone number by selecting digits using the rotary control element. Once complete, the user may rotate the rotary control element clockwise to the right end point. The right end point may be associated with a call action when the multimedia system is in the telephone mode. Once the user has fully rotated the rotary control element clockwise to the right end point, the user may select the call action, e.g., by pressing the rotary control element. As a result, the inputted phone number may be dialed.

FIG. 1 shows an example process according to an implementation of the disclosed subject matter. As shown, an automotive multimedia system may receive an indication that a rotary control element is moved to a first end position, e.g., a left end position, at 101. An automotive multimedia system may be integrated in an automotive and/or may be operated by a mobile device that is in communication with an automotive multimedia system. A mobile device may be in communication with an automotive multimedia system via various connection types such as any wired or wireless connection (e.g., Bluetooth, USB, micro USB, etc.) Upon receiving an indication that rotary control element is moved to a first end position at 101, a first action may be performed, e.g., by the automotive multimedia system, based on a selection of the first action at the first end position, at 102. A selection of the first action at the first end position may be received in a variety of ways. For example, a selection may be made by pressing the rotary control element, pressing a button located on or near the rotary control element, and the like. Next, an indication may be received that the rotary control element is moved to a second end position, e.g., a right end position, at 103. A second action may be performed based on a selection of the second action at the second end position, at 104.

The multimedia system may offer multiple functions and may operate in various different modes. The rotary control element may be used to control one or more modes. Examples of modes may be telephone mode, audio mode, video mode, navigation mode, entertainment mode, interior setting mode, exterior setting mode, and any other mode that may be used by a user to operate one or more functions in an automotive multimedia system. When in any mode, the rotary control element may be used to control the mode, in the multimedia system, in response to movement of the rotary control element between the end positions. In each mode, each of the end positions may be associated with a particular action relevant to each mode. For example, in a telephone mode, the left end position may be associated with a delete function and the right end position may be associated with a call function. As another example, in an audio mode, the left end position may be associated with a previous track function and the right end position may be associated with an advance to next track function. As yet another example, in a navigation mode, the left end position may be associated with a return to address input function and the right end position may be associated with function that announces the next step in the navigation sequence. By assigning a specific function to each end position in a particular mode, a user may easily and quickly find and select the specific function by simply rotating the rotary control knob to an end position while in a particular mode. This disclosed feature reduces the need for the user's attention to a user interface or visual display and may result in a more enjoyable user experience.

Figure 2:
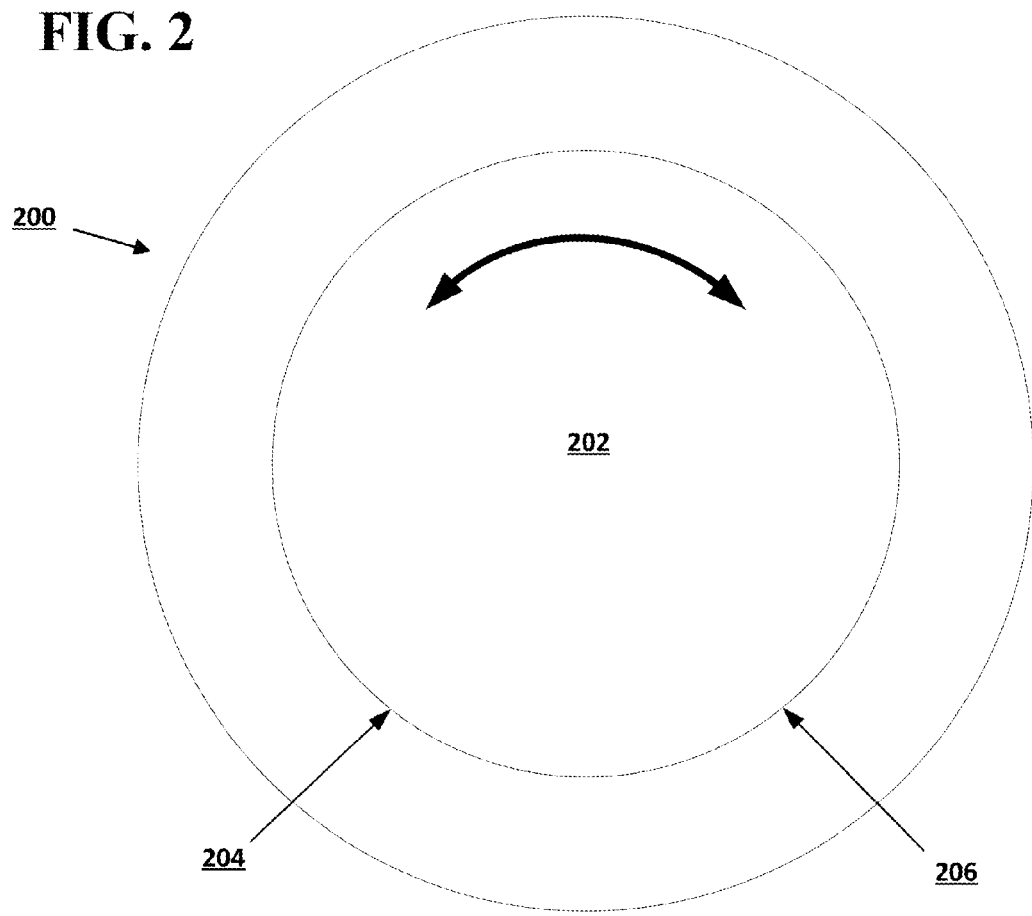
FIG. 2 shows an example rotary controller arrangement according to an embodiment of the disclosed subject matter.

FIG. 2 shows an example rotary controller arrangement according to an embodiment of the disclosed subject matter. As shown, a rotary controller arrangement 200 may comprise a rotary control element 202. The rotary control element 202 may be a rotatable knob that rotates in the clockwise and counterclockwise directions with or without stops, and controls a function and/or mode in an automotive multimedia system. In addition, the rotary control element 202 may be used to navigate a user interface and/or visual display associated with an automotive multimedia system. For example, rotation of the rotary control element may correlate with movement and/or position of a cursor in a user interface and may be used to make a selection of a portion of the user interface, highlight a portion of the interface, and the like.

Figure 3:
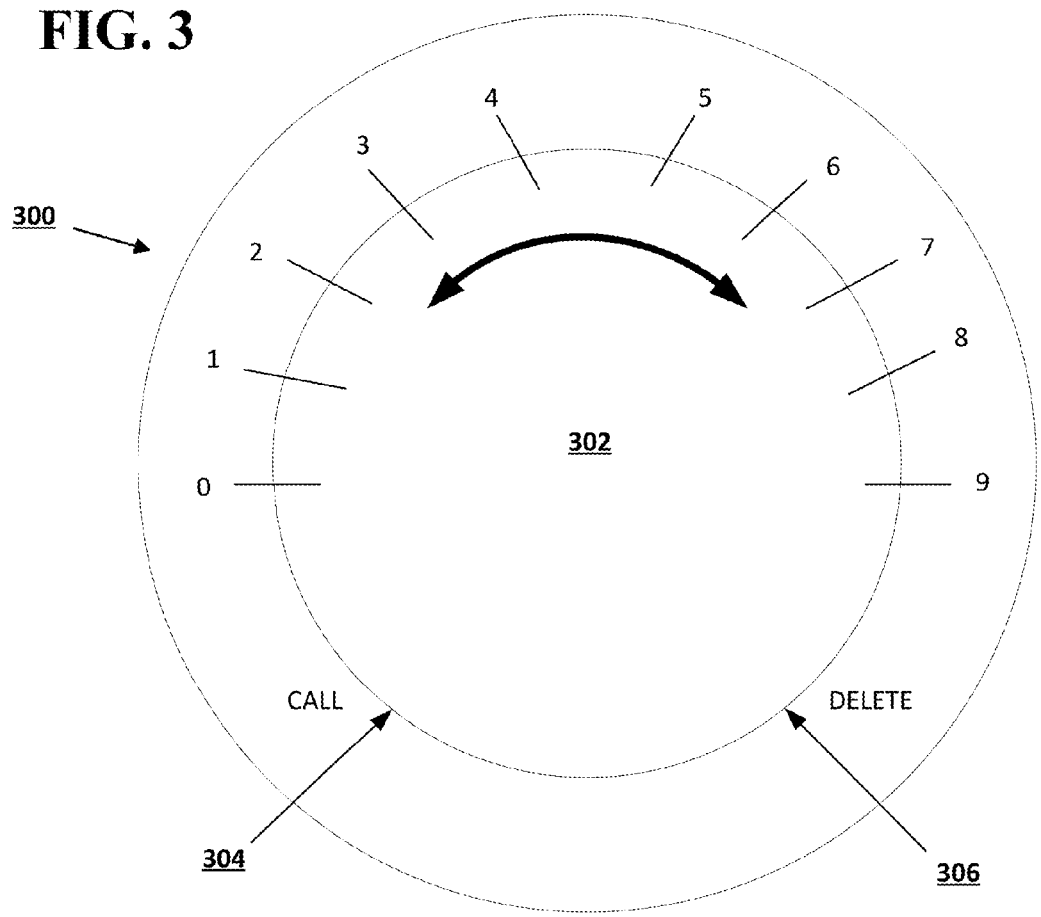
FIG. 3 shows an example rotary controller arrangement according to the present disclosure.

FIG. 3 shows an example rotary controller arrangement according to the present disclosure. As a specific example, in a telephone mode, the rotary control element 302 may be rotated clockwise and counterclockwise between the first end position 304 and the second end position 306 to select digits for input of a phone number. For example, as shown in FIG. 3, digits 0-9 may be displayed in a user interface and there may be multiple positions between the first end position 304 and the second end position 306. Each of these positions may correlate to one of the digits 0-9 such that as the rotary control element 302 is rotated between the first end position 304 and the second end position 306, a unique digit may be selected relative to the rotation of the rotary control element 302. In this case, the first action associated with the first end position 304 may be an action to place a phone call and the second action associated with the second end position 306 may be an action to delete a prior received input.

The rotary control element 202 may be moved to a first end position 204 by rotating the rotary control element 202 counterclockwise. Similarly, the rotary control element 202 may be moved to a second end position 206 by rotating the rotary control element 202 clockwise. In some cases, the rotary control element 202 may be infinitely rotatable without stops. The end positions may not be "hard" stop positions, i.e., it may be possible to rotate the rotary control element after the end point element has been selected. In such a configuration, rotating the rotary control element further in the same direction may not result in the selected option being changed. In some cases, the location of each of the end positions may be based on a location relative to the opposite end position. For example, the location of the first end position 204 may be defined as a three-quarter rotation from the second end position 206. As another example, the location of the first end position 204 may be defined by an angular displacement relative to the second end position 206, such as a 270 degree rotation between the first end position 204 and the second end position 206. In some cases, the speed of rotation of the rotary control element 202 may be used to determine that the user intends to rotate to an end position. For example, in order to delete a previous input, the user may rotate the rotary control element 202 at a relatively high speed in order to quickly select an action, e.g., delete action, at an end position. In particular, a user may quickly jump to an end position in response to a relatively fast turn of the rotary control element 202. In the case in which the rotary control element 202 is rotatable between physical "hard" stops at fixed end positions 204 and 206, the location of each end position 204, 206 may be the furthest point of rotation at which the rotary control element 202 cannot physically be rotated any further. In some cases, and as shown in FIG. 2, the first end position 204 may be located at a 7 o'clock position on the rotary control element and the second end position 206 may be located at a 5 o'clock position on the rotary control element. The specific relative locations of the end positions shown and described in FIGS. 2 and 3 are provided as illustrative examples only, and, more generally, one or more end positions may be located at any point around the rotary control element.

In some cases, a user may receive an indication that the rotary control element 202 has been rotated to an end position in a variety of ways such as an audio signal, a vibration signal, and the like. For example, when the user rotates the rotary control element 202 to the end position 204, an audio signal such as a beep may be played to indicate to the user that the end point has been reached. As another example, when the user rotates the rotary control element 202 to the end position 204, a vibration signal such as a vibration output by the rotary control element may indicate to the user that the end point has been reached.

Although described herein primarily with respect to a rotary control element for controlling an automotive multimedia system, embodiments of the disclosed subject matter may use and may be used with other rotary control elements and systems. For example, a slider, touchscreen, or other control element may be used. Generally, any such control element may have a first end position to which a first action is assigned and a second end position to which a second action is assigned. The disclosed rotary control element may also be used for interacting with and controlling any other suitable system other than an automotive multimedia system.

A rotary controller arrangement may or may not be integrated in an automotive multimedia system. In an implementation, the communication between a rotary controller arrangement and an automotive multimedia system may be across one or more bridges between the interfaces. For example, the communications between a rotary controller arrangement and an automotive multimedia system may be managed or assisted by a coordinating application (which may or may not operate on the same system on which the rotary controller arrangement and/or automotive multimedia system is operating) or a third device, such as, a coordinating device, a local coordinator, a remote server, etc. In such cases, the coordinating application and/or third device may, for example, receiving an indication that a rotary control element is moved to an end position and provide the indication to the automotive multimedia system. In some cases, the automotive multimedia system may receive an indication that a rotary control element is moved to an end position and provide the indication to the third device, such as a mobile device in communication with the automotive multimedia system. The coordinating application and/or third device may also perform an action based on a selection of the action at the end position. For example, in telephone mode, a mobile device connected to the automotive multimedia system may place a call upon receiving an indication that the call action has been selected at an end position. Furthermore, more than one intermediate device may be implemented to facilitate communication between the devices, rotary controller arrangement and an automotive multimedia system.

Figure 4:
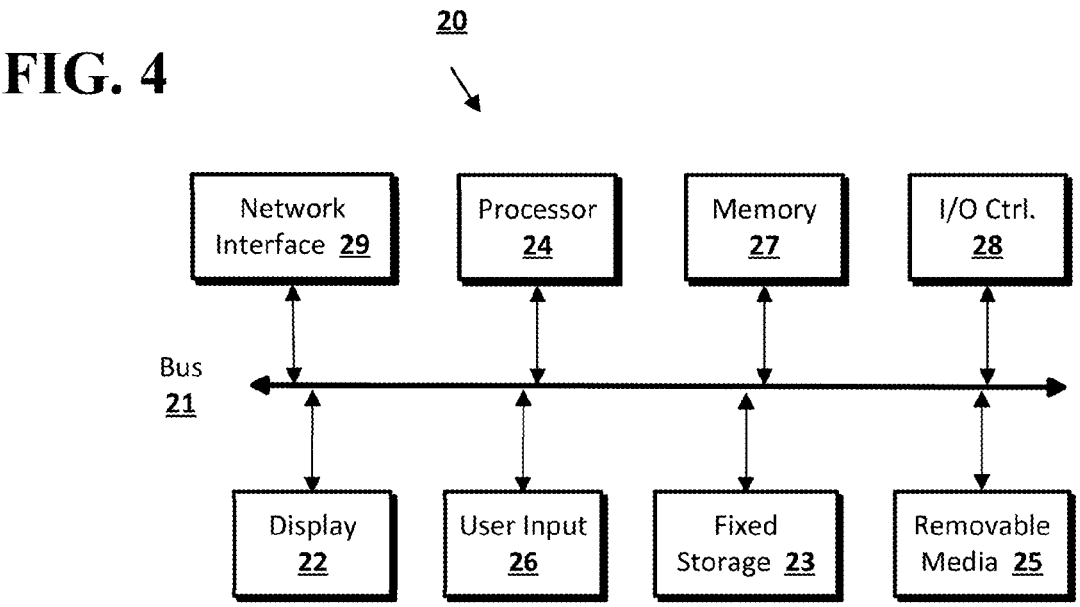
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
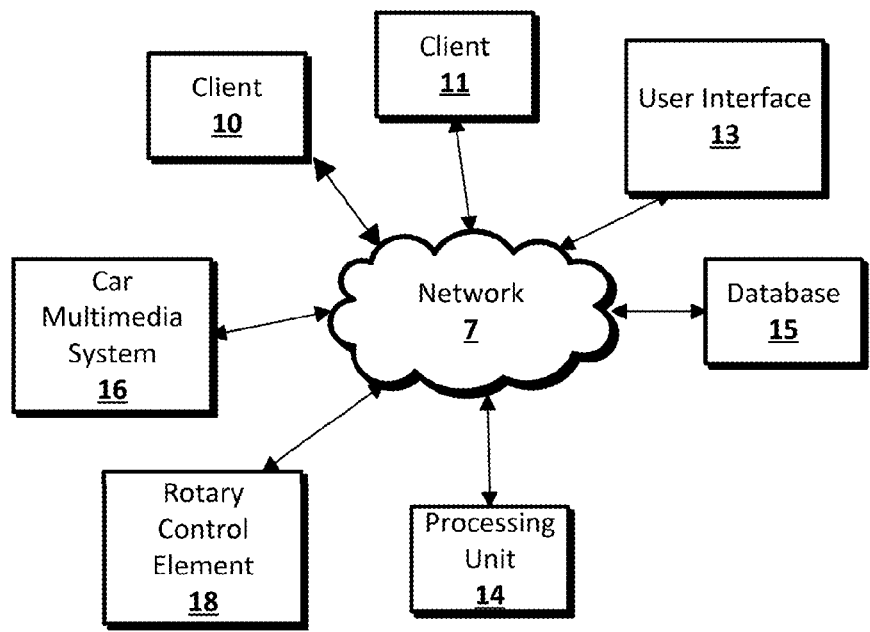
FIG. 5 shows a network configuration according to an embodiment of the disclosed subject matter.

FIG. 5 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, rotary control element 18, automotive multimedia system 16, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving an indication that a rotary control element is moved to a first end position in a first device, the first end position being a hard stop beyond which the rotary control element cannot physically be rotated any farther;
   providing the indication to a second device external to the first device;
   performing a first action based on a selection of the first action at the first end position in the second device;
   receiving an indication that the rotary control element is moved to a second end position in the first device, the second end position being a hard stop beyond which the rotary control element cannot physically be rotated any farther; and
   performing a second action different from the first action in the second device based on a selection of the second action at the second end position,
   wherein the first action and the second action are selected from the group consisting of: a delete action, a call action, a previous multimedia track action, a next multimedia track action, a return action, and a next navigation step action.

2. The method of claim 1, further comprising controlling a mode, in a multimedia system, in response to movement of the rotary control element between the first end position and the second end position.

3. The method of claim 1, wherein in a first mode, the first end position is associated with the first action and the second end position is associated with the second action, and wherein, in a second mode, the first end position is associated with a third action and the second end position is associated with a fourth action.

4. The method of claim 1, wherein the mode is a telephone mode, and wherein the rotary control element is rotated clockwise and counter clockwise between the first end position and the second end position to select digits for input of a phone number.

5. The method of claim 4, further comprising a plurality of positions between the first end position and the second end position, wherein each position in the plurality of positions represents a unique digit.

6. The method of claim 1, the first end position is located at a 7 o'clock position on the rotary control element.

7. The method of claim 1, the second end position is located at a 5 o'clock position on the rotary control element.

8. A system comprising:
   a rotary control element; and
   a processor configured to:
      receive an indication that the rotary control element is moved to a first end position, the first end position being a hard stop beyond which the rotary control element cannot physically be rotated any farther;
      provide the indication to an external device;
      perform a first action based on a selection of the first action at the first end position in the external device;
      receive an indication that the rotary control element is moved to a second end position, the second end position being a hard stop beyond which the rotary control element cannot physically be rotated any farther; and
      perform a second action different from the first action in the external device based on a selection of the second action at the second end position,
   wherein the first action and the second action are selected from the group consisting of: a delete action, a call action, a previous multimedia track action, a next multimedia track action, a return action, and a next navigation step action.

9. The system of claim 8, wherein the processor is further configured to control a mode, in a multimedia system, in response to movement of the rotary control element between the first end position and the second end position.

10. The system of claim 9, wherein in a first mode, the first end position is associated with the first action and the second end position is associated with the second action, and wherein, in a second mode, the first end position is associated with a third action and the second end position is associated with a fourth action.

11. The system of claim 9, wherein the function is a telephone function, and wherein the rotary control element is rotated clockwise and counter clockwise between the first end position and the second end position to select digits for input of a phone number.

12. The system of claim 11, wherein the rotary control element comprises a plurality of positions between the first end position and the second end position, wherein each position in the plurality of positions represents a unique digit.

13. The system of claim 8, the first end position is located at a 7 o'clock position on the rotary control element.

14. The system of claim 8, the second end position is located at a 5 o'clock position on the rotary control element.

* * * * *